May 2, 1944.                H. B. MARIS                2,347,702
              DEVICE FOR MEASURING EXTREMELY SMALL ANGLES
                        Filed April 11, 1941
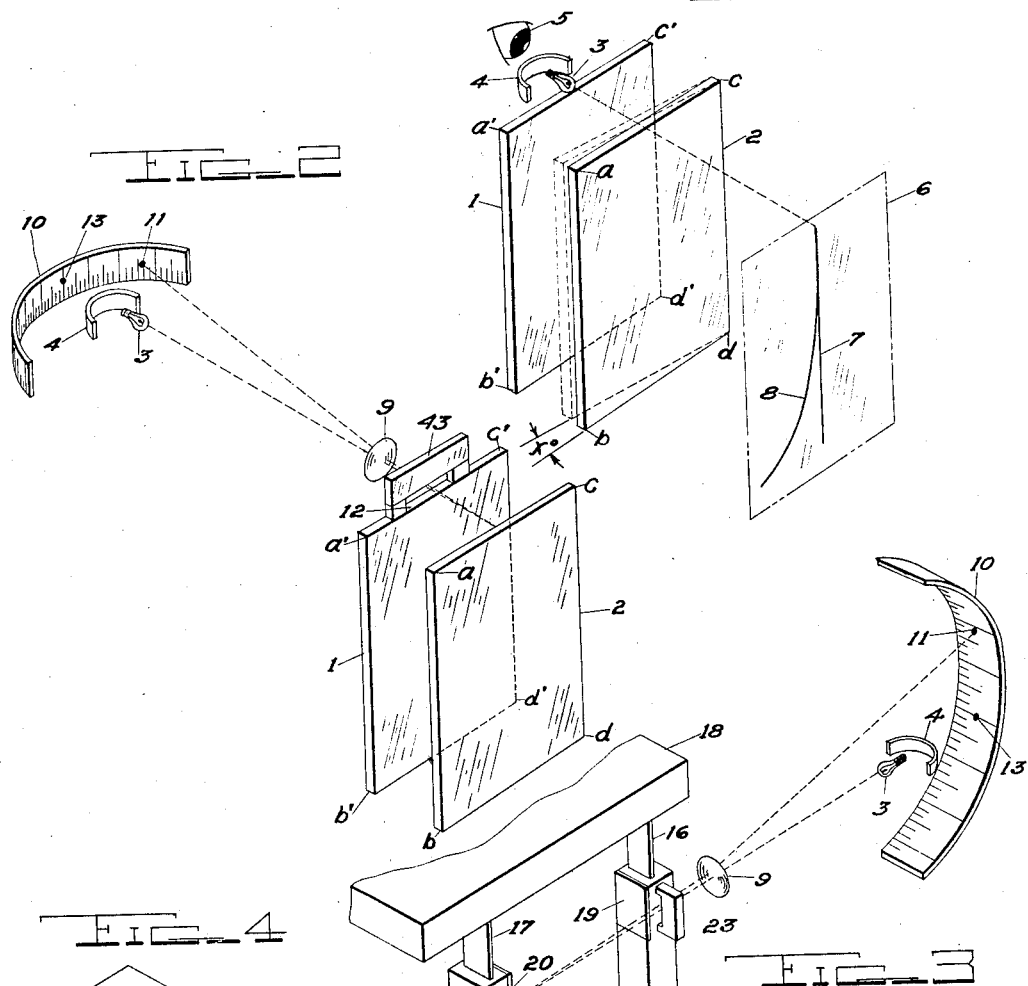
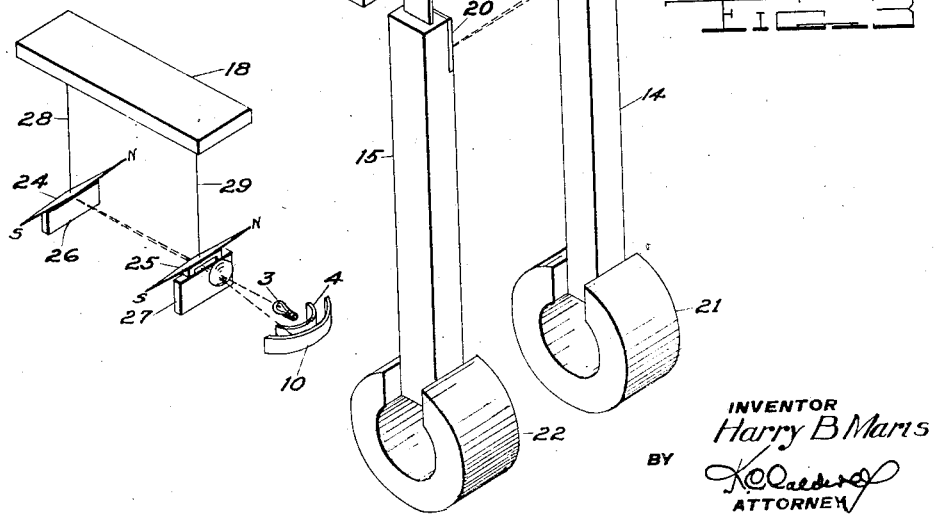
INVENTOR
Harry B Maris
BY
ATTORNEY Patented May 2, 1944

2,347,702

UNITED STATES PATENT OFFICE 2,347,702

DEVICE FOR MEASURING EXTREMELY SMALL ANGLES

Harry B. Maris, Riverdale, Md.

Application April 11, 1941, Serial No. 388,101

12 Claims. (Cl. 88—24)

(Granted under the act of March 3, 1883, as amended April 30, 1928; 370 O. G. 757)

This invention relates to a device for measuring extremely small angles by optical means by the use of which a very accurate amplified indication of such angles may be supplied. This device is particularly applicable to the measurements of extremely small changes in any force field.

When two mirrors are not quite parallel and a light beam is reflected back and forth between them, each reflection adds or subtracts twice the angle of separation of the mirrors to the angle of the incident beam. The differences are added if the repeated reflections move in the direction of increased separation and subtracted if progress is in the opposite direction. This type of multiplication can be used to indicate very small angles of separation. It can be used to measure very minute deviations from a reference state of angular relationship between reflecting plane surfaces.

It is a further object of this invention to provide a device utilizing the above described phenomenon for the accurate measurement and indication of minute variations in the separation between two facing mirror surfaces.

It is another object of this invention to provide such a device which will produce a greatly magnified indication of such variations.

It is a further object of this invention to provide a device in which such deviations are directly related to the magnitudes of small forces and which employs the above described phenomenon in the accurate measurement and indication of such forces.

It is a still further object of this invention to provide such devices in a simple and rugged form.

Referring now to the drawing:

Figure 1 is a schematic showing in perspective of an elementary form of the invention;

Figure 2 is a schematic showing in perspective of a second embodiment of the invention;

Figure 3 is a schematic showing in perspective of a third embodiment of the invention; and Figure 4 is a schematic showing in perspective of a fourth embodiment of the invention.

The principles employed in the invention are illustrated in Figure 1 in which the reference numerals 1 and 2 indicate two plane mirrors having opposing reflecting surfaces and being of rectangular shape. These mirrors are initially positioned so that their upper and lower edges are parallel but the lower edges are closer together than the upper edges. A source of light 3 is positioned close to the upper edge of mirror 1 and supplied with a shield 4. Under such circumstances an observer's eye 5 positioned close behind the shield 4 would observe a series of virtual images appearing to lie in a plane 6 behind mirror 2. These images would lie along some line 7 and starting from the top of the line each successive image would lie farther from its predecessor as the number of reflections increased. The images lying near the top of the line would be so close together as to appear to be superimposed. However, the images appearing further down the line would be sufficiently separated as to become easily differentiated.

If the light source 3 and the eye 5 are in a plane normal to both mirrors 1 and 2 the line of images will appear to be straight and to lie on a plane back of 2 and parallel to 1. If now the mirror 2 be rotated about its edge c, d through an angle x so that its edge a, b moves toward mirror 1, the line of images will bend at the bottom and assume the appearance indicated at line 8. If the images are counted according to the number of reflections each has undergone, each image will be found to have suffered an angular displacement from the original straight line equal to the number of its reflections times the angle of rotation x of the mirror 2. Multiple images will be visible in mirror 2 because of the fact that light has available many paths from source 3 to the eye 5. If the light and eye are moved back from mirror 1 so that the beam falling on 2 is nearly parallel, the number of possible paths is diminished. It is possible to find aposition for the eye and the source of light where only a single image; for example, the 20th, is visible. Displacement of the 20th image will under these conditions be 40 times the angle x of the rotation of mirror 2 about the axis c, d. The image seen by the eye under these circumstances is a virtual image. The use of such an image is simple and convenient and for some purposes is most satisfactory.

In the device as shown in Fig. 2 the two mirrors 1 and 2 are arranged for reflection of a real image. The light source 3 with its shield 4 is placed a considerable distance from 1, preferably about 10 times the distance separating 1 and 2 and just inside the focal distance of lens 9. The beam upon 9 is nearly parallel but slightly divergent and after many reflections between 1 and 2 returns and is focused to an image of 3 on a scale 10 at 11. The incident beam after passing through lens 9 passes through a slot 12 above which is a mirror 43 having a reflecting surface directed toward the scale 10. If the edges $a, c$ and $a'c'$ of the mirrors 1 and 2 are parallel, the reflected image of the light beam will appear at 13. If now mirror 2 is rotated through the small angle $x$ as before so that edge $a, b$ of mirror 2 approaches edge $a'b'$ of mirror 1, the reflected image of the beam will move toward the position 11 on the scale. If the beam is reflected $n$ times from mirror 2 the angle of rotation of the reflected beam will be $2nx$. By using gold mirror surfaces for mirrors 1 and 2, 50 reflections may easily be made available. This will give an amplification of 100 to 1 for the angle $x$. The mirror 43 throws an image of the source 3 on the scale at 13 to act as a reference point.

While the embodiments of Figs. 1 and 2 have been described as though mirror 1 were fixed, it should be understood that this is not necessarily true, since mirror 1 may be movable about its edge $c'd'$. The deviation of the emergent beam is a measure of relative movement of the mirrors 1 and 2 about their sides $c'd'$ and $c, d$ respectively, and is valid whether there is actual movement of both mirrors or not.

A third form of the device is shown in Fig. 3. It consists of 2 pendulums 14 and 15 hung by flexible spring members 16 and 17 from a mounting means 18. Near the top portions of these pendulums the facing surfaces thereof are provided with small rectangular mirrors 19 and 20. The pendulums are prevented from oscillating by magnetic damping devices 21 and 22. They are so mounted that the mirrors 19 and 20 are slightly inclined, the inclination being such that the planes containing these mirrors would intersect along a vertical line. Mounted near the top of pendulum 14 is a slotted mirror 23 having a mirror surface directed toward the lens 9. The arrangement of light source, focusing lens, shield and scale are the same as in Fig. 2 except that the scale extends in a vertical direction. Light passing through the slot between the pendulum 14 and the mirror 23 falls on mirror 20 and then is reflected in a horizontal line of reflections between mirrors 19 and 20 and finally returns through the lens 9 to focus at 13. In the repeated reflections from mirror 20 double the angle of separation between mirrors 19 and 20 is added at each reflection. If one of the pendulums swings through a greater angle than the other so that the line of intersection between the planes containing mirrors 19 and 20 is no longer a vertical line, then the line of reflections will be deviated from the horizontal.

If the angle of relative swing between the pendulums is indicated by $x$, then the $n$th image is deviated from its normal path by an angle equal to $2nx$ and the final emerging ray of light will be reflected on to the scale 10 at some point such as 11 along a path which diverges from the original path of the incident beam by an angle of the same value.

A device of the type shown in Fig. 3 and operated by gravity can be used to determine the rate of turn or bank of an airplane by mounting pendulums as shown along a line normal to the fore and aft axis of the airplane. In such a case the centrifugal force on the outside pendulum during a turn or bank would be greater than that acting on the inside pendulum and would therefore give a different component to be added to the effect of gravity on the outside pendulum. The sensitivity of the device could be controlled by adjusting the flexibility of the supporting means 16 and 17. More sensitive pendulums could be employed for measuring gravity gradients in geophysical prospecting.

The same principles can be applied to suspended magnetic needles which would operate in the same fashion as the pendulums in Fig. 3. A device utilizing such magnets is shown in Fig. 4 where the needles 24 and 25 are shown suspended from a support 18 by means of wires 28 and 29. Each of the needles bears rigidly secured thereto a mirror 26 or 27 having facing reflecting surfaces. The mirror 27 has a slot formed therein for the passage of light from the source 3. The needles are free to turn about the axis passing through the wires, air damping being secured by the use of large light weight mirrors. The mirrors are so hung as to have, when at rest, a separation such that their planes would intersect in a horizontal line. One of the mirrors could be fixed relative to the support, if desired. By such a means an extremely small gradient in a magnetic field such as that produced by a small magnet; for example, those used in the control of a magnetic mine, or magnetic material such as the hull of a sunken ship, could be detected, and movement in the direction of increasing gradient would locate the source of magnetic disturbance. The sensitivity of such a magnetic device is dependent principally upon the stability of the supporting means.

It should be understood that the practice of the invention is not limited to the embodiments illustrated and described but only by the scope and limitations of the appended claims.

The invention described herein may be manufactured and/or used by or for the Government of the United States of America for governmental purposes without the payment of any royalties thereon or therefor.

I claim:

1. Means for measuring extremely small angles, comprising means bearing a first plane reflecting surface, means bearing a second plane reflecting surface, means normally supporting said first and second surface bearing means with their reflecting surfaces in inclined face-to-face relation and supporting said second surface bearing means for relative movement with respect to said first surface bearing means about an axis normal to the line of intersection of the planes containing said normally inclined surfaces, means for directing a substantially parallel beam of light from a point behind said first surface past an edge of said first surface at its end remote from said line on to said second surface, said beam of light lying in a plane normal to said surfaces prior to relative movement thereof and incident on said second surface at such an angle that it will be reflected a plurality of times between said surfaces and after having been so reflected will emerge at substantially its point of incidence, whereby relative movement of said surfaces about said axis will cause said emerging beam to swing through an angle depending on the magnitude of relative movement of said surfaces and the number of reflections between said surfaces.

2. Means for measuring extremely small angles, comprising means bearing a first plane reflecting surface, means bearing a second plane reflecting surface, means normally supporting said first and second surface bearing means with their reflecting surfaces in inclined face-to-face relation and supporting said second surface bearing means for relative movement with respect to said first surface bearing means about an axis normal to the line of intersection of the planes containing said normally inclined surfaces, means for directing a substantially parallel beam of light from a point behind said first surface past an edge of said first surface at its end remote from said line on to said second surface, said beam of light lying in a plane normal to said surfaces prior to relative movement thereof, and incident on said second surface at such an angle that it will be reflected a plurality of times between said surfaces and after having been so reflected will emerge at substantially its point of incidence, whereby relative movement of said surfaces about said axis will cause said emerging beam to swing through an angle depending on the magnitude of relative movement of said surfaces and the number of reflections between said surfaces, and scale means located in the path of said emergent beam.

3. Means for measuring extremely small angles, comprising means bearing a first plane reflecting surface, means bearing a second plane reflecting surface facing said first surface and inclined thereto, means supporting said surface bearing means for movement about axes lying in a plane normal to the line of intersection of the planes containing said surfaces, a source of light located behind one of said surfaces, means for forming a portion of light from said source into a parallel beam and directing said beam on to the other of said surfaces, said beam of light lying in a plane normal to said surfaces prior to relative movement thereof and incident to said other surface at such an angle that it will be reflected a plurality of times between said surfaces and after having been so reflected will emerge at substantially its point of incidence, whereby relative movement of said surfaces about said axes will cause said emerging beam to be offset from its point of incidence in a direction normal to the plane containing said axes, the amount of said offset being proportional to the amount of said relative movement, scale means located in the path of said emergent beam and reflecting means so located as to intercept a portion of said incident beam and reflect it on to said scale as an indication of the zero point of said scale.

4. Means for measuring extremely small angles, comprising means bearing a first plane reflecting surface, means bearing a second plane reflecting surface, means normally supporting said first and second surface bearing means with their reflecting surfaces in inclined face-to-face relation and supporting said surface bearing means for movement about axes lying in a plane normal to the line of intersection of the planes containing said normally inclined surfaces, and means for directing a substantially parallel beam of light from a point behind one of said surfaces past an edge of said first surface at its end remote from said line on to the other of said surfaces, said beam of light lying in a plane normal to said surfaces prior to movement thereof and incident on said other surface at such an angle that it will be reflected a plurality of times between said surfaces and after having been so reflected will emerge at substantially its point of incidence, whereby relative movement of said surfaces about said axes will cause said emerging beam to swing through an angle depending on the magnitude of relative movement of said surfaces and the number of reflections between said surfaces.

5. A device for measuring extremely small forces, comprising a pair of pendulums, a supporting means common to said pendulums, each of said pendulums being formed with a plane reflecting surface, said surfaces being in facing relationship and said pendulums being so mounted as to cause said surfaces to lie in planes which intersect along a line normal to the plane containing the axes of swing of said pendulums, a source of light, means forming a portion of the light from said source into a substantially parallel beam and directing said beam on to one of said reflecting surfaces, said beam lying in a plane normal to said surfaces and incident on one of said reflecting surfaces at such an angle that it will be reflected a plurality of times between said surfaces and after having been so reflected will emerge at substantially its point of incidence, whereby relative movement of said pendulums about their axes of swing will cause the point of emergency of said beam to be offset from its point of incidence in a direction normal to the axis of swing of the pendulum bearing said one of said reflecting surfaces, the amount of said offset being proportional to the amount of said relative movement.

6. A device is claimed in claim 5, said device comprising a reflecting means carried by the one of said pendulums on the reflecting surface of which said beam of light is not incident, said reflecting means being so positioned as to intercept a portion of said incident beam and, when said pendulum is not in motion, reflect it in a direction opposite to the direction of said incident beam, and a scale means so positioned that said intercepted and reflected beam and said emerging beam will be intercepted thereby, said scale being so graduated as to indicate the magnitude of the distance between the points of interception of said two beams thereon.

7. A device for measuring gradients in a magnetic field, comprising a pair of elongated magnets, a means bearing a plane reflecting surface rigidly associated with each of said magnets in such a manner as to partake of every movement of said magnet, said surfaces being in facing relation, means supporting said magnets for relative movement about parallel axes normal to the axes of form of said magnets, said reflecting surface bearing means being so arranged that when said magnets extend in parallel directions the planes containing said surfaces intersect in a line lying in a plane normal to said axes of relative movement, means directing light from a point behind one of said surfaces on to the other of said surfaces, said light directing means being so located that a portion of the light directed on to the other of said surface will line in a plane normal to said surfaces and will be incident on said other surface at such an angle that it will be reflected a plurality of times between said surfaces and after having been so reflected will emerge at substantially its point of incidence, whereby relative movement of said magnets about said axes will cause said emerging light to be offset from its point of incidence in a direction normal to the plane containing said axes of relative movement, the amount of said offset being proportional to the amount of said relative movement.

8. A device for measuring gradients in a magnetic field comprising a pair of elongated magnets, a mirror rigidly associated with each of said magnets in such a manner as to partake of every movement of said magnet, means supporting said magnets for relative movement about parallel axes normal to the axes of form of said magnets, the reflecting surfaces of said mirrors being in facing relation, said mirrors being so arranged that when said magnets extend in parallel directions the planes containing the reflecting surfaces of said mirrors intersect in a line lying in a plane normal to said axes of relative movement, said mirrors being of such size and weight as to effectively damp out oscillations of said magnets about said axes of relative movement, means directing light from a point behind one of said surfaces on to the other of said surfaces, said light directing means being so located that a portion of the light directed on to the other of said surfaces will lie in a plane normal to said surfaces and will be incident on said other surface at such an angle that it will be reflected a plurality of times between said surfaces and after having been so reflected will emerge at substantially its point of incidence, whereby relative movement of said magnets about said axes will cause said emerging light to be offset from its point of incidence in a direction normal to the plane containing said axes of relative movement, the amount of said offset being proportional to the amount of said relative movement.

9. Means for measuring extremely small angles, comprising means bearing a first plane reflecting surface, means bearing a second plane reflecting surface, means normally supporting said first and second surface bearing means with their reflecting surfaces in inclined face-to-face relation and supporting said surface bearing means for movement about axes lying in a plane normal to the line of intersection of the planes containing said normally inclined surfaces, and a source of light so located at a point behind one of said surfaces that light from said source will travel past an edge of said one surface at its end remote from said line and impinge directly on the other of said surfaces, said light source being so located that a portion of the light impinging on said other surface will lie in a plane normal to said surface prior to any movement thereof and will be incident on said other surface at such an angle that it will be reflected a plurality of times between said surfaces and after having been so reflected will emerge at substantially its point of incidence, whereby relative rotation of said surfaces about said axes will cause said emerging beam to swing through an angle depending on the magnitude of relative rotation of said surfaces and the number of reflections between said surfaces.

10. Means for measuring extremely small angles, comprising a pair of elements each provided with a plane reflecting surface, means normally supporting said elements with their reflecting surfaces face-to-face and in predetermined mutually inclined relation and supporting said surfaces for relative movement between said mutually inclined relation and a skew relation, a source of light, and means directing a collimated beam of light originating at said source from a point behind one of said surfaces, past the edge thereof and on to the other of said surfaces at the divergent ends of said normally inclined surfaces, said beam lying in a plane normal to said surfaces when said surfaces have said predetermined mutual inclination and incident on said other surface at an angle such that it will be reflected a plurality of times between said surfaces and after having been so reflected will emerge at substantially its point of incidence, whereby relative angular movement of said surfaces from said predetermined inclined relation to said skew relation will cause said emerging beam to swing through an angle depending on the magnitude of said relative angular movement and the number of reflections between said surfaces.

11. Means for measuring extremely small angles, comprising a pair of elements each provided with a plane reflecting surface, means normally supporting said elements with their reflecting surfaces face-to-face and in predetermined mutually inclined relation and supporting said surfaces for relative movement between said mutually inclined relation and a skew relation, a source of light, means directing a collimated beam of light originating at said source from a point behind one of said surfaces, past the edge thereof and on to the other of said surfaces at the divergent ends of said normally inclined surfaces, said beam lying in a plane normal to said surfaces when said surfaces have said predetermined mutual inclination and incident on said other surface at an angle such that it will be reflected a plurality of times between said surfaces and after having been so reflected will emerge at substantially its point of incidence, whereby relative angular movement of said surfaces from said predetermined inclined relation to said skew relation will cause said emerging beam to swing through an angle depending on the magnitude of said relative angular movement and the number of reflections between said surfaces, and scale means positioned in the vicinity of said incident beam for indicating the angular change in orientation of said emerging beam.

12. In apparatus for measuring extremely small angular movements, a first mirror, means normally supporting said first mirror in a given plane, a second mirror, means normally supporting the second mirror in face-to-face inclined relation to the first mirror with a given pair of companion edges of said mirrors disposed in substantially parallel relation and spaced apart a distance greater than the distance between other pairs of companion edges of said mirrors, at least one of said mirror supporting means permitting angular movement of its associated mirror relative to the other mirror, means directing a substantially parallel beam of light past one of said given pair of edges onto a face of one of said mirrors at its margin adjacent the other of said given pair of edges at an angle such that said beam is reflected a plurality of times between the faces of said mirrors at successively varying angles of incidence and after having been so reflected will emerge from a marginal face of one of said mirrors adjacent one of said given pair of edges, whereby a change in the relative position of said mirrors will produce a change in the orientation of said emergent beam depending on the magnitude of the change in position of said mirrors and the number of reflections therebetween.

HARRY B. MARIS.